Patented Oct. 23, 1951

2,572,238

UNITED STATES PATENT OFFICE 2,572,238

CARBOXYLIC ACIDS FROM MERCAPTANS

Seaver A. Ballard, Orinda, Kenneth E. Furman, Berkeley, and Harry de V. Finch, El Cerrito, Calif., assignors to Shell Development Company, San Francisco, Calif., a corporation of Delaware No Drawing. Application November 20, 1948, Serial No. 61,302

9 Claims. (Cl. 260—413)

This invention relates to a process for the preparation of organic carboxylic acids of the aliphatic type containing three or more carbon atoms. More particularly, the invention relates to a process for the conversion of organic sulfur compounds containing an atom of divalent sulfur directly linked to a hydrocarbon radical of the aliphatic type to valuable organic carboxylic acids or salts thereof containing the same number of carbon atoms as said hydrocarbon radical of the organic sulfur compound reactant. The invention relates particularly to a process for directly converting aliphatic primary mercaptans to aliphatic carboxylic acids containing the same number of carbon atoms as the mercaptan, and it is of especial value for converting primary aliphatic mercaptans containing eight or more carbon atoms to higher aliphatic carboxylic acids having the same number of carbon atoms as the mercaptan reactant.

It is known that organic compounds which contain a pair of carbon atoms linked together by a non-aromatic carbon-to-carbon double bond, such as olefins and substituted olefins, and particularly olefins which contain a terminal carbon atom directly linked by an olefinic bond to another carbon atom, that is, the alpha- or 1-olefins, may be caused to react with hydrogen sulfide and with organic mercaptans, to produce valuable products of addition reaction. One such process is described in United States Patent No. 2,052,268, granted to Williams and Allen on August 25, 1936. It is known that by employing suitable conditions the addition of the hydrogen sulfide or the mercaptan to the olefinic compound may be so controlled in its direction that it predominately proceeds in a direction contrary to the direction that would be in accord with addition according to Markownikoff's rule. That is to say, the addition of the hydrogen sulfide to the primary olefinic compound may be so controlled and regulated that instead of predominantly secondary mercaptans and secondary organic sulfides, there may be produced predominantly primary mercaptans and primary organic sulfides by reaction between olefinic compounds and hydrogen sulfide and organic mercaptans, respectively. Corresponding addition contrary to Markownikoff's rule may be obtained in the case of olefinic compounds other than primary or alpha-olefinic compounds, provided that the structure of the molecule is asymmetric about the olefinic bond or the respective carbon atoms are bonded to unlike numbers of hydrogen atoms. Disclosures of processes whereby such addition of hydrogen sulfide and/or organic mercaptans to olefinic compound contrary to Markowinkoff's rule may be accomplished may be found in the following United States Patents: No. 2,352,435 to Hoeffelman; No. 2,392,294 to Rust and Vaughan; No. 2,392,295 to Rust and Vaughan; No. 2,398,479 to Vaughan and Rust; No. 2,411,961 to Evans, Vaughan and Rust; No. 2,411,983 to Vaughan and Rust.

Organic mercaptans and organic sulfides, or thioethers, may be prepared or obtained in other ways than by the above type of reaction between olefinic compounds and hydrogen sulfide or organic mercaptans. They may be synthesized according to other known procedures, and in other cases they may be recovered or separated from naturally occurring products, such as petroleum oils, shale oils, and the like, either as naturally occurring therein or as having been formed therein by a treatment of the naturally occurring material. For the preparation in substantial quantity of organic mercaptans and organic thioethers of a desired predetermined structure and at low cost, the aforementioned processes whereby hydrogen sulfide and mercaptans are added to olefinic compounds at the olefinic bond offer particular advantages and desirability.

While organic mercaptans and organic sulfides (thioethers) are known to be useful in various applications, a potential field of application therefor that to our best knowledge has never heretofore been realized, at least in a practicable fashion, lies in their conversion to carboxylic acids. Given a practicable method of converting organic mercaptans and organic thioethers, particularly organic mercaptans of the aliphatic type, to carboxylic acids containing the same number of carbon atoms as the sulfur-containing compound, a new and desirable source of synthetically prepared carboxylic acids would become available. A priori, the direct conversion of an organic mercaptan or an organic thioether, such as an aliphatic primary mercaptan or thioether, to a carboxylic acid containing the same number of carbon atoms, would not appear possible to achieve. It will be observed that the conversion of, for example, an aliphatic primary sulfide to a carboxylic acid containing the same number of carbon atoms is not merely a dehydrogenation or oxidation reaction. Dehydrogenation, or oxidation, of the mercaptan thus would form a disulfide or a derivative of an oxy-acid of sulfur, such as a sulfonic acid, or at the most a thionic acid or a thiolic acid. Since the conversion of an organic mercaptan or thioether to a carboxylic acid entails replacement of the atom of sulfur and conversion of the —CH₂—SH group to a —COOH group, it did not appear that the reaction could be accomplished in a single step or that it could be accomplished without the use in succession of a plurality of regeants.

The present invention is based upon the surprising discovery that organic mercaptans and organic thioethers of the aliphatic type, may be directly converted to valuable carboxylic acids (in the form of salts thereof) containing the same number of carbon atoms as are contained in a radical directly linked to the divalent sulfur atom, by treating the organic mercaptans and organic thioethers of the aliphatic type with a caustic alkali in the molten state and in the presence of a catalyst which is in addition to the caustic alkali. In one of its more specific embodiments, the invention provides a process for the direct conversion of organic mercaptans of the primary aliphatic type to valuable carboxylic acids containing the same number and arrangement of carbon atoms as the organic radical that is linked to the mercapto sulfur atom. We have found that by treatment with a caustic alkali in the presence of a catalyst, suitable catalysts being described hereinafter and illustrative catalysts which may be employed according to the invention being specifically enumerated, carboxylic acids, in the form of their salts, may be obtained in good yields directly from the hereinbefore and hereinafter described and defined organic sulfur-containing compounds. The process of the invention provides a method for the direct and economical preparation of valuable carboxylic acids from raw materials which are available or may be prepared economically from easily obtainable raw materials, e. g., olefins.

Although the process of the invention may be applied broadly to organic mercaptans and sulfides of the aliphatic type, it will be described with particular reference to the conversion of organic mercaptans of the primary aliphatic type to carboxylic acids. By reference to organic mercaptans and sulfides of the aliphatic type, we intend to refer particularly to those organic compounds which contain in their structure the grouping represented by

in which the carbon atom is an aliphatic type, that is, not embraced in a ring or cycle of atoms. The free valences of the carbon atom may be satisfied by union with an atom of carbon and two atoms of hydrogen, by union with two atoms of carbon and one of hydrogen, or by union with three atoms of carbon. In the organic mercaptans, the free valency of the sulfur atom is satisfied by union with an atom of hydrogen while in the organic sulfides (thioethers) it is satisfied by union with the free valency of a monovalent hydrocarbon radical, which may or may not be the same in structure as the radical containing the carbon atom appearing in the formula. The invention is particularly concerned with treatment of organic compounds containing the indicated structural unit and having at least three directly interconnected carbon atoms in the radical containing the carbon atom appearing in the above formula.

In the primary organic mercaptans of the aliphatic type, two of the free valences at the carbon atom above are satisfied by union with atoms of hydrogen and the third is satisfied by union with an atom of carbon, and the free valency at the sulfur atom is satisfied by union with an atom of hydrogen. In other words, the compounds with which the invention is particularly concerned as reactants contain at least three carbon atoms and contain the structure represented by the formula

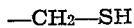

in which the free valency is satisfied by union with a carbon atom which in turn is directly linked to at least one additional carbon atom. The invention is not limited to organic mercaptans in which the —CH₂—SH group is linked to aliphatic groups only; for example, the

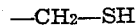

group may be linked to a cyclic group such as an alicyclic or an aromatic group. Generally, however, the mercaptans employed will be those in which the —CH₂—SH group is linked to an aliphatic hydrocarbon group, such as a substituted or unsubstituted, branched-chain or straight-chain alkyl group. The term organic mercaptan (or thioether or sulfide) of the aliphatic type is meant to be generic to those compounds which contain a mercapto or thio atom directly linked to an aliphatic carbon atom, while the term aliphatic primary mercaptan is limited to those compounds in which the mercapto sulfur atom is linked to a carbon atom at the terminus of an aliphatic, i. e., open chain hydrocarbon radical, which may or may not be substituted.

Suitable mercaptans which may be employed in the process of the invention include, without being limited to, the following: propyl mercaptan, butyl mercaptan, isobutyl mercaptan, pentyl mercaptan, 3-methylbutyl mercaptan, hexyl mercaptan, 2,3-dimethylbutyl mercaptan, 3,3-dimethylbutyl mercaptan, 2,2-dimethylbutyl mercaptan, heptyl mercaptan, 3-ethylpentyl mercaptan, octyl mercaptan, monyl mercaptan, 2-propylhexyl mercaptan, 2,3-dimethylheptyl mercaptan, decyl mercaptan, hendecyl mercaptan, dodecyl mercaptan, tridecyl mercaptan, 3-propyldecyl mercaptan, tetradecyl mercaptan, pentadecyl mercaptan, hexadecyl mercaptan, heptadecyl mercaptan, octadecyl mercaptan, nonadecyl mercaptan, eicosyl mercaptan, heneicosyl mercaptan, and even higher mercaptans, and their branched-chain analogs. The above compounds and their various homologs and analogs may be substituted in the nucleus and/or in the substituents in various degrees by straight-chain, cyclic, and/or heterocyclic radicals, and by substituent groups or atoms other than hydrocarbon. More than one mercapto group may be present. Thus, polycarboxylic acids may be produced by the process of the invention. Other substituents may be present, such as alkoxy, halogen, nitro, amino, alkyl amino, etc. Such other substituents, if present, may or may not be affected by the conditions employed in the execution of the process of the invention. If they are affected, e. g., modified or split out, such change therein may or may not be desirable. The hydrocarbon radical that is linked to the mercapto sulfur atom generally will be saturated, although it may contain one or more unsaturated carbon-to-carbon linkages, such as one or more olefinic linkages which, if more than one is present, may or may not be conjugate to each other, and/or one or more acetylenic linkages. Unsaturated carboxylic acids thus may be produced, since generally such olefinic and/or acetylenic linkages, if present, will be unaffected during the execution of the process of the invention.

The mercapto or sulfhydryl group preferably is linked to a carbon atom that is at the terminus of a chain, that is one that is directly bonded to two atoms of hydrogen and to one atom of carbon. When the mercapto group is attached to a penultimate carbon atom of a chain, lower yields of carboxylic acids are obtained. It is thought that there may first occur an isomerization reaction whereby the secondary or tertiary mercaptan is converted to a primary mercaptan, which in turn is converted to a carboxylic acid.

The conversion of the organic sulfur-containing reactants to carboxylic acids is effected according to the process of the invention by treatment with a molten caustic alkali in the presence of a catalyst in addition to the alkali. The presence of a catalyst has been found to be essential for the results desired in accordance with the invention since in the absence of a catalyst no detectable amounts of carboxylic acids are formed, even though the conditions be otherwise the same as are employed in the execution of the desired process. As the catalyst there are employed particularly heavy metals and suitable compounds thereof. Thus there may be employed one heavy metal, which may be in the elemental or free state or which may be in the form of a compound, such as an oxide, a sulfide, or a salt thereof. Again, the catalyst may comprise more than one heavy metal and one may be in the free or elemental form and the other or others may be in the form of a suitable compound or compounds, or all may be in the elemental form or all may be in combined form. If a plurality of heavy metals is employed to catalyze the desired reaction according to the process of the invention, and both are in combined form, e. g., in union with a non-metallic element, such as sulfur, oxygen, halogen, etc., both heavy metal elements may be present in the basic or cationic radical, as in mixed oxides or sulfides of a plurality of heavy metal elements, or one or all of the heavy metal elements may be contained in the acidic or anionic radical, as in salts of oxyacids of oxy-acid-forming heavy metals, particularly salts of oxy-acids of heavy metals of the IVth, Vth and VIth groups of the periodic table.

The heavy metals include the following elements: Fe, Ni, Ru, Rh, Pd, Mn, Cr, V, Mo, Ge, Cb, Sb, Re, Os, Ir, Pt, W, Ta, La, Ce, Pb, Cu, Ag, Co, Ga, Au, and Zn. Suitable compounds thereof include, for example, sulfides, oxides, tellurides, selenides, phosphides, and salts, especially of oxy-acids of heavy metals, such as chromates, tungstates, vanadates, molybdates, etc. Mixtures or alloys of a plurality of heavy metal elements may be used.

Preferred catalysts are those which may be prepared from raw materials available at reasonable cost by procedures adapted to large scale operations, which have a high activity both qualitatively and quantitatively, and which retain their activity at a desired level over long periods of use. A preferred class of catalysts which may be employed in the execution of the process of the invention and which admirably fulfill the foregoing requirements is composed of the oxides and sulfides of heavy metal elements of the VIth and VIIIth groups of the periodic table of the elements. Because of their lower cost and their excellent efficiency, base metals of the foregoing class are especially suited to the objects of the invention, particularly the oxides and sulfides of molybdenum, chromium, tungsten, nickel, iron, and cobalt. Catalysts composed of mixed sulfides and/or oxides of at least one base metal from the VIIIth group and at least one heavy metal of the VIth group represent a preferred class of catalysts which may be employed with especially favorable results in the execution of the process of the invention. Illustrative mixed catalysts of this type include tungsten-nickel sulfide, tungsten-cobalt sulfide, chromium-iron oxide, molybdenum-nickel sulfide, and others.

According to the process of the invention, mercaptans and thioethers as hereinbefore and hereinafter described are converted to carboxylic acids in the form of salts thereof by treatment with a molten caustic alkali in the presence of a heavy metal-containing catalyst. As the caustic alkali, there preferably is employed an alkali metal hydroxide. Sodium hydroxide and potassium hydroxide and mixtures thereof are preferred since they may be employed at reasonable cost and are highly effective. The generic invention is not limited thereto, however, since in the broader case lithium hydroxide and even the hydroxides of rubidium and of casium may be employed. A single caustic alkali may be used, or mixtures of two or more of the caustic alkalies may be applied, such as eutectic or other mixtures of sodium hydroxide and potassium hydroxide, as when it is desired to employ temperatures below the melting points of the individual alkalies.

In the execution of the process of the invention, the organic mercaptan or thioether is contacted simultaneously with a bath of the molten alkali and with the catalyst. This may be accomplished in any suitable manner. For example, the catalyst if insoluble in the molten alkali may be in finely-divided state and suspended in the molten alkali as by agitation or stirring. If the catalyst is in more massive state, such that suspension in the molten alkali by mechanical agitation would be impractical, it may be mechanically supported in the bath of molten alkali or otherwise contacted therewith and with the organic sulfur containing reactant. For example, a vessel may be filled with pellets, lumps, fragments, etc., of the catalyst which are covered by the molten alkali and the mercaptan or thioether introduced thereinto, a stream of the molten alkali may be passed over a fixed bed of the catalyst and the mercaptan or thioether contacted therewith at the same time, or it even is possible to operate efficiently by employing a suitable reaction vessel the walls, etc., of which are coated with the catalyst and by introducing the mercaptan or thioether into a bath of molten alkali in the vessel. The catalyst, if soluble, may be in the form of a solution in the molten caustic alkali.

The amount of the catalyst conveniently may be within the range of from about 2% to 30% or more based on the weight of the caustic alkali, a preferred range being from about 5% to about 20% of the weight of the caustic alkali.

In carrying out the process of the invention, it is preferred to contact the organic mercaptan or thioether with the molten alkali metal hydroxide and the catalyst by introducing it in a fluid form, i. e., gaseous or liquid state, below the surface of a bath of molten hydroxide containing the catalyst. The preferred practice will depend in part upon the particular reactant used. For example, lower-boiling and more readily volatilized mercaptans may be introduced into the bath of molten hydroxide in the vapor phase, whereas when higher boiling mercaptans are used it generally will be more convenient to introduce the mercaptan in liquid form beneath or onto the surface of the molten bath, in which modification the liquid reactant may or may not be preheated before contacting. A further modification which may be desirable in some instances is to contact the mercaptan or thioether in solid form with the molten bath.

The temperature of the molten alkali is not critical, but should be sufficiently high that adequate mixing may be achieved, and should not be so high that excessive decomposition of the organic products would result. The temperature advantageously may be from about 185° C. to about 485° C., a preferred range being in the lower portion of the broader range, particularly from about 200° C. to about 300° C. The rate of addition of the organic mercaptan or thioether to the molten bath may be varied within rather wide limits, rates from about 0.1 to 5 moles per hour per 1000 grams of the molten caustic alkali generally being suitable.

The process of the invention may be carried out either batchwise or in a continuous or intermittent manner. In batch operations, the mercaptan or thioether is treated with an excess of the molten caustic alkali in the presence of the catalyst. Extremely large amounts of the alkali may be used. The upper limit is not critical and is governed primarily by the means available for recovering the desired product subsequent to the treatment. From as little as 1.5 to as much as 40 or more moles of caustic alkali per mole of the organic mercaptan or thioether may be used, a preferred range being from about 5 to about 20 moles of the alkali per mole of the organic mercaptan or thioether. During the addition of the mercaptan or thioether, molten caustic alkali may be withdrawn continuously or intermittently from the bath for recovery of product therefrom, and additional alkali or alkali and catalyst may be added to replace that withdrawn or consumed.

In carrying out the process of the invention, the carboxylic acid product is produced in the form of its salt with the caustic alkali employed. The free acid may be recovered from the alkali according to suitable known procedures, e. g., by acidification to neutralize the excess alkali and to liberate the free carboxylic acid. According to a further embodiment of the process, the carboxylic acid may be recovered in the form of an insoluble soap, e. g., a calcium, zinc or aluminum soap, by dissolving the hydroxide containing the product in water, and adding a suitable salt or alkali to precipitate the desired soap. The alkali remaining in the solution may be recovered and reused. Other applicable methods may be employed for the recovery of the desired product.

A preferred embodiment of the invention may be illustrated by the conversion of a long-chain aliphatic primary mercaptan containing from 8 to 20 carbon atoms to the corresponding carboxylic acid, such as the conversion of dodecyl mercaptan to lauric acid. The mercaptan, preferably in the liquid state, may be preheated and introduced as a continuous stream below the surface of a molten mixture of sodium hydroxide and potassium hydroxide containing a catalyst comprising a heavy metal element. The mixture preferably contains the hydroxides in weight ratios of NaOH/KOH from about 1:4 to about 5:1, although higher or lower relative amounts of the hydroxides may be employed, to and including the respective pure hydroxides. The hydroxide or hydroxides may be of "C. P." quality, although for reasons of economy technical grades ordinarily will be employed since the impurities present in technical grades of the hydroxides do no harm. The total amount of the hydroxides contained in the bath, if the process is to be conducted in a batchwise manner, will be greater than necessary to neutralize acidic products formed in the process, and if carried out in a continuous manner the addition of the long-chain mercaptan to the bath will be so correlated with addition of further amounts of the alkali metal hydroxide or hydroxides and withdrawal of reaction mixture from the reaction zone for product recovery, that there is present in the reaction zone an excess of the alkali hydroxide.

The molten bath of the alkali hydroxide preferably has suspended in it about 10% by weight of a finely divided catalyst comprising a mixed sulfide of one heavy metal from each of the VIth and VIIIth groups of the periodic table, such as a catalyst composed of tungsten-nickel sulfide. While the molten bath is agitated, the stream of the mercaptan is introduced below the surface at a flow rate of about 0.8 mole of mercaptan per mole of alkali hydroxide per hour, or in a more general case at a rate of from about 0.2 to about 2.0 moles of mercaptan per mole of alkali hydroxide per hour. During the addition of the mercaptan, the temperature of the bath is kept at about 200° C. to about 300° C., preferably at about 250° C.

Addition of the mercaptan to the bath is discontinued when unreacted alkali still remains. For recovery of the carboxylic acid product, the bath may be cooled, the cooled products dissolved in water, the solution acidified with a strong acid, such as hydrochloric, sulfuric, or other strong mineral acid. The acidified solution may be extracted with an immiscible solvent in which the carboxylic acid is soluble, such as ether, isopentane, etc., and for recovery of the pure long-chain carboxylic acid the extract may be subjected to fractional distillation or other suitable known procedures.

The following example is illustrative of the invention more broadly disclosed hereinbefore and claimed in the appended claims:

*Example.*—To a molten mixture of 180 parts by weight sodium hydroxide and 220 parts by weight potassium hydroxide containing suspended therein 40 parts of finely-ground nickel-tungsten sulfide, in a copper-lined reaction vessel, there was added 160 parts of dodecyl mercaptan at a rate of 0.8 mole per 1000 grams of molten hydroxide per hour. The temperature of the molten caustic was kept at about 250° C. during the addition. The cooled products were dissolved in water, the solution was acidified by addition of hydrochloric acid, and extracted with several portions of ether. The combined ether-extracts were fractionally distilled and lauric acid recovered as the fraction distilling at from 160° C. to 165° C. under 20 millimeters' mercury pressure. The lauric acid, after recrystallization from ether, melted at 43.4–44° C., both alone and when mixed with a known pure sample of lauric acid. A sample of lauramide prepared from the recrystallized lauric acid melted at 99.4–100.2° C., both alone and when mixed with a known pure same of lauramide.

Other carboxylic acids of the aliphatic type, such as higher fatty acids, may be prepared from the appropriate mercaptans and thioethers according to the method illustrated in the above example.

Among the many carboxylic acids which may be produced from mercaptans according to the process of the invention may be mentioned the following: butyric acid, valeric acid, trimethylacetic acid, caproic acid, heptylic acid, caprylic acid, pelargonic acid, capric acid, hendecanoic acid lauric acid, tridecanoic acid, myristic acid, pentadecanoic acid, palmitic acid, margaric acid, stearic acid, nonadecanoic acid, and arachidic acid. There even may be produced dicarboxylic acids, such as adipic acid and tetradecanedioic acid, and also unsaturated acids, such as 4-tetradecenoic acid and oleic acid, by employing the suitable dimercaptans and unsaturated mercaptans, respectively. The process of the invention is of particular value for the preparation of higher saturated fatty acids, particularly those containing from 8 to 20 carbon atoms, for which it affords an improved and convenient method of synthesis.

We claim as our invention:

1. A process for effecting the direct conversion of an aliphatic primary mercaptan to an alkali metal salt of an aliphatic carboxylic acid which comprises contacting said aliphatic primary mercaptan with a molten alkali metal hydroxide in the presence of a solid catalyst composed of sulfides of tungsten and nickel at a temperature not greater than about 485° C.

2. A process for effecting the direct conversion of an aliphatic primary mercaptan to an alkali metal salt of an aliphatic carboxylic acid which comprises contacting said aliphatic primary mercaptan with a molten alkali metal hydroxide in the presence of a solid catalyst composed of sulfides of tungsten and nickel at a temperature of from about 185° C. to about 485° C.

3. A process for the preparation of lauric acid which comprises passing dodecyl mercaptan into a molten bath of a mixture of the hydroxides of sodium and potassium containing finely-ground dispersed solid tungsten-nickel sulfide catalyst at a temperature of about 250° C., discontinuing the introduction of the dodecyl mercaptan prior to complete neutralization of the hydroxides contained in said bath, and converting the alkali metal laurate thereby produced to lauric acid.

4. A process for effecting the direct conversion of dodecyl mercaptan to alkali metal laurate which comprises contacting dodecyl mercaptan with a molten alkali metal hydroxide in the presence of a solid catalyst composed of sulfides of tungsten and nickel at a temperature not over about 485° C.

5. A process for effecting the direct conversion of a long-chain aliphatic primary mercaptan to an alkali metal salt of a long-chain aliphatic carboxylic acid which comprises contacting a long-chain aliphatic primary mercaptan with a molten alkali metal hydroxide in the presence of a sulfide of a heavy metal at a temperature from about 185° C. to about 485° C.

6. A process for effecting the direct conversion of a primary aliphatic mercaptan to an alkali metal salt of an aliphatic carboxylic acid of the same number of carbon atoms which comprises contacting a primary aliphatic mercaptan with a molten mixture of the hydroxides of potassium and sodium in the presence of a catalyst selected from the group consisting of metals and metal compounds of group VI and group VIII metals of the periodic table and mixtures thereof at a temperature not over about 485° C.

7. A process for effecting the direct conversion of an organic compound containing a thio sulfur atom which is directly linked to a hydrocarbon radical of the aliphatic type, said compound being selected from the class consisting of organic monosulfides and mercaptans, to an alkali metal salt of a carboxylic acid of the same number of carbon atoms as said hydrocarbon radical which comprises contacting said organic compound with a molten alkali metal hydroxide in the presence of a catalyst selected from the group consisting of metals and metal compounds of group VI and group VIII metals of the periodic table and mixtures thereof at a temperature not over about 485° C.

8. A process for effecting the direct conversion of a mercaptan of the primary aliphatic type to an alkali metal salt of a carboxylic acid of the same number of carbon atoms as the mercaptan, which comprises contacting said mercaptan with a molten mixture of potassium hydroxide and sodium hydroxide in the presence of a sulfide of a heavy metal at a temperature of from about 185° C. to about 485° C.

9. A process for effecting the direct conversion of a mercaptan of the primary aliphatic type, said compound being selected from the class consisting of organic monosulfides and mercaptans, to an alkaline metal salt of a carboxylic acid of the same number of carbon atoms as the mercaptan, which comprises contacting said mercaptan with a molten alkali metal hydroxide in the presence of a heavy metal element.

SEAVER A. BALLARD.
KENNETH E. FURMAN.
HARRY DE V. FINCH.

REFERENCES CITED

The following references are of record in the file of this patent:

UNITED STATES PATENTS

| Number | Name | Date |
|---|---|---|
| 2,384,817 | Chitwood | Sept. 18, 1945 |
| 2,470,876 | Spindt et al. | May 24, 1949 |

OTHER REFERENCES

Chem. Abstracts, 1931, 25:754.